(12) United States Patent
Nibarger et al.

(10) Patent No.: US 8,867,176 B1
(45) Date of Patent: *Oct. 21, 2014

(54) CORROSION PROTECTION UTILIZING A MILLED, TOP SPIN VALVE GMR SENSOR

(75) Inventors: John P. Nibarger, Superior, CO (US); Ricky L. Ewasko, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 11/447,636

(22) Filed: Jun. 6, 2006

(51) Int. Cl.
*G11B 5/33* (2006.01)

(52) U.S. Cl.
USPC .................................................. 360/324.1

(58) Field of Classification Search
None
See application file for complete search history.

(56) References Cited

U.S. PATENT DOCUMENTS

| | | | | |
|---|---|---|---|---|
| 6,381,107 B1* | 4/2002 | Redon et al. | | 360/324.2 |
| 6,847,510 B2* | 1/2005 | Childress et al. | | 360/324.2 |
| 2003/0123198 A1* | 7/2003 | Sugawara et al. | | 360/314 |
| 2004/0052006 A1* | 3/2004 | Odagawa et al. | | 360/324.1 |
| 2005/0219766 A1* | 10/2005 | Machita et al. | | 360/324.1 |
| 2007/0242394 A1* | 10/2007 | Gill | | 360/324.1 |

OTHER PUBLICATIONS

Nakashio et al, "Flux Guide Type Tunnel-Valve Head for Tape Storage Applications", IEEE Transactions on Magnetics, vol. 38, No. 5, Sep. 2002, pp. 1925-1927.
Druyvesteyn et al., "Magnetoresistive Heads", IEEE Transactions on Magnetics, vol. MAG-17, No. 6, Nov. 1981, pp. 2884-2889.
Shimazawa et al., "Evaluation of Front Flux Guide-Type Magnetic Tunnel Junction Heads", IEEE Transactions on Magnetics, vol. 35, No. 5, Sep. 2000, pp. 2542-2544.
Folkerts et al., "Performance of Yoke Type GMR Heads", IEEE Transactions on Magnetics, vol. 31, No. 6, Nov. 1995, pp. 2591-2596.
Koshikawa et al., "Flux-Guided MR Head for Very Low Flying Height", IEEE Transactions on Magnetics, vol. 30, No. 6, Nov. 1994, pp. 3840-3842.
Tsang et al., "Study of Recessed MR Sensors with Unlaminated and Multi-Laminated Flux-Guides", IEEE Transactions on Magnetics, vol. 28, No. 5, Sep. 1992, pp. 2289-2291.
Druyvesteyn et al., "Thin-Film Read Head for Analog Audio Application", IEEE Transactions on Magnetics, vol. MAG-19, No. 5, Sep. 1983, pp. 1748-1750.
U.S. Appl. No. 11/177,606, filed Aug. 8, 2005, Nibarger et al.
U.S. Appl. No. 11/017,170, filed Dec. 20, 2004, Watson et al.

\* cited by examiner

*Primary Examiner* — David D Davis
(74) *Attorney, Agent, or Firm* — Brooks Kushman P.C.

(57) ABSTRACT

A corrosion-resistant magnetic sensor and a method for making the corrosion-resistant magnetic sensor. The magnetic sensor includes a first layer that is a pinned layer, the first layer having a first edge. The magnetic sensor also includes a second layer that can be a non-magnetic metal layer, the second layer having a second edge corresponding to the first edge, wherein the second layer is adjacent the first layer. The magnetic sensor also has a third layer that can be a free layer, the third layer having a third edge which projects outwardly relative to the first edge and the second edge.

6 Claims, 4 Drawing Sheets

CORROSION PROTECTION UTILIZING A MILLED, TOP SPIN VALVE GMR SENSOR

BACKGROUND OF THE INVENTION

1. Field of the Invention

The present invention relates generally to magnetic sensors and particularly to corrosion protection in a top-pinned spin valve sensor.

2. Description of the Related Art

Corrosion in a metal, usually copper, layer of a magnetic read head can be a problem. Corrosion can reduce the effectiveness of magnetic read heads, or even cause a magnetic read head to fail. One method to address this problem is through the use of anisotropic magneto-resistive (AMR) sensors. However, the percentage change in sensor resistance ($\Delta R/R$) for an anisotropic magneto-resistive sensor is only about 2%. The percentage change in sensor resistance is a metric of total signal available from the sensor.

The sensor's $\Delta R/R$ can be increased using the giant magneto-resistance (GMR) effect. The $\Delta R/R$ for a giant magneto-resistance sensor is about 10% to about 20%. However, a major drawback associated with the giant magneto-resistance sensor is that the giant magneto-resistance sensor re-introduces the problem with corrosion.

SUMMARY OF THE INVENTION

The present invention provides for a corrosion-resistant magnetic sensor and a method for making the corrosion-resistant magnetic sensor. The magnetic sensor includes a first layer that is a pinned layer, the first layer having a first edge. The magnetic sensor also includes a second layer, that can be a non-magnetic metal layer, the second layer having a second edge corresponding to the first edge, wherein the second layer is adjacent the first layer. The magnetic sensor also has a third layer that can be a free layer, the third layer having a third edge which projects outwardly relative to the first edge and the second edge.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
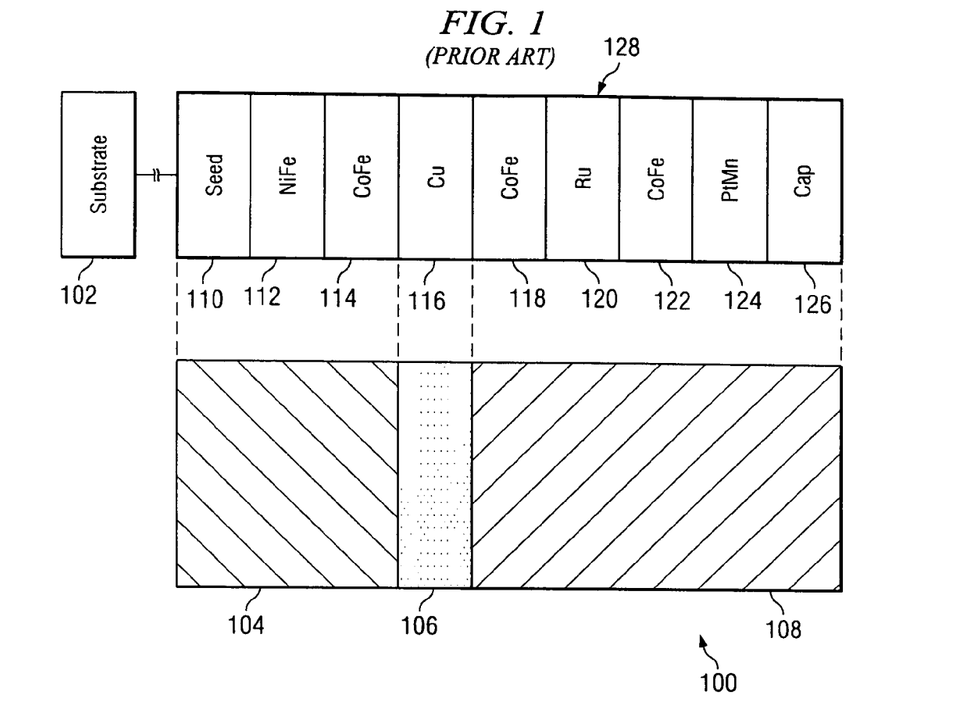
FIG. 1 shows a prior art giant magneto-resistive sensor, in which the invention can be implemented.

FIG. 1 shows a prior art giant magneto-resistive sensor, in which the invention can be implemented. Giant magneto-resistive sensor 100 is a top spin valve magnetic sensor. Giant magneto-resistive sensor 100 includes a stack of layers, including substrate 102, free layer 104, non-magnetic metallic layer 106, and pinned layer 108.

Pinned layer 108 provides a reference magnetization and free layer 104 provides a rotatable magnetization. The magnetization of pinned layer 108 is fixed while the magnetization of free layer 104 rotates under the influence of an external magnetic field. In this example, the external magnetic field is the magnetic field of the magnetic media that is to be read by giant magneto-resistive sensor 100.

In giant magneto-resistive sensor 100, the change in electrical resistance in the sensor depends on the angular difference between the magnetizations of pinned layer 108 and free layer 104. The changes in resistance over time caused by the angular difference between the magnetizations of pinned layer 108 and free layer 104 can be measured. The angular difference between the magnetizations of pinned layer 108 and free layer 104 thereby is caused by the changing magnetic fields from the magnetic media. The measured changes in resistance can be converted into data usable by a data processing system.

Each of layers 104, 106, and 108 can include a number of sub-layers. For example, free layer 104 can include a number of sub-layers. In an illustrative example, free layer 104 includes seed layer 110, magnetic layer 112, and free reference layer 114. Each layer can be made of a variety of materials. For example, seed layer 110 can include Ta (tantalum), NiFe (nickel iron), NiFeCr (nickel iron chromium), magnetic layer 112 can include NiFe, Co (cobalt), CoFeB (cobalt iron boron), and free reference layer 114 can include CoFe (cobalt iron), Co, and CoFeB. Magnetic layer 112 and free reference layer 114 are films that are used to optimize the giant magnetoresistive effect using the reference layer while also obtaining better magnetic properties through the addition of the magnetic layer. Other appropriate materials can also be used for these layers.

In an illustrative example, non-magnetic metallic layer 106 includes a non-magnetic metal layer 116 made of a non-magnetic metal, such as Cu (copper). Other non-magnetic metals can be used in place of non-magnetic metal layer 116, such as CuAu (copper gold), CuAg (copper silver), Au (gold), and Ag (silver). Non-magnetic metallic layer 116 acts as a spacer between free layer 104 and pinned layer 108. In other examples, non-magnetic metal layer 116 can include other layers of non-magnetic metals or other layers of non-magnetic materials. Other appropriate materials can also be used for these layers.

For example, pinned layer 108 can include pinned reference layer 118, antiferromagnetic coupling layer 120, first pinned layer 122, antiferromagnet layer 124, and cap layer 126. Cap layer 126 serves as a cap to the entire sensor stack and can include materials such as Ta (tantalum) or Ti (titanium). Together, pinned reference layer 118, antiferromagnetic coupling layer 120, and first pinned layer 122 can be referred-to as a synthetic antiferromagnet (SAF). The synthetic antiferromagnet is used to increase the pinning strength of pinned reference layer 118.

Each of the sub-layers in pinned layer 108 can be made from a variety of materials. For example, antiferromagnet layer 124 can include PtMn (platinum manganese), other manganese based antiferromagnetic alloys, as well as insulators such as NiO (nickel oxide). First pinned layer 122 can include CoFe (cobalt iron) and other materials such as CoFeB and Co. Antiferromagnetic coupling layer 120 can include materials such as Ru (ruthenium). Pinned reference layer 118 can include materials such as CoFe and other materials such as CoFeB. Each of these layers can be varied, and not all layers need be present to form pinned layer 108, though at a minimum pinned layer 108 includes a material such as CoFe in order to create a pinning magnetic field. Other appropriate materials can also be used for these layers. Pinned layer 108 and free layer 104 form a stack that can be referred to as a top spin valve because the antiferromagnetic pinning layer 124 is deposited after the free layer.

Each layer in the stack has an edge that, in an illustrative example, is aligned along the same axis. Thus, giant magneto-resistive sensor 100 has edge 128 that typically abuts or is placed near a magnetic media, such as a magnetic tape. However, the methods and devices described herein can be implemented in both synthetic antiferromagnetic structures and single ferromagnetic films.

In an illustrative example, the relative thickness of the elements within each layer is Ta(50 Å)/Ni$_{80}$Fe$_{20}$(35 Å)/Co$_{90}$Fe$_{10}$(30 Å)/Cu(25 Å)/Co$_{90}$Fe$_{10}$(32 Å)/Ru(10 Å)/Co$_{90}$Fe$_{10}$(30 Å)/Pt$_{49}$Mn$_{51}$(200 Å)/Ta(50 Å). However, the thickness of the elements within each layer can be varied, as can the elements, alloys, and compounds that make up giant magneto-resistive sensor 100. For example, antiferromagnet layer 124 can be made from elements, alloys, and compounds such as described above. Similarly, antiferromagnetic layer 124 can be made from various Mn based antiferromagnetic alloys, as well as insulators such as NiO. Similarly, the number of layers that make up giant magneto-resistive sensor 100 can also be varied such that more or fewer layers of the same or different substances are present.

Figure 3:
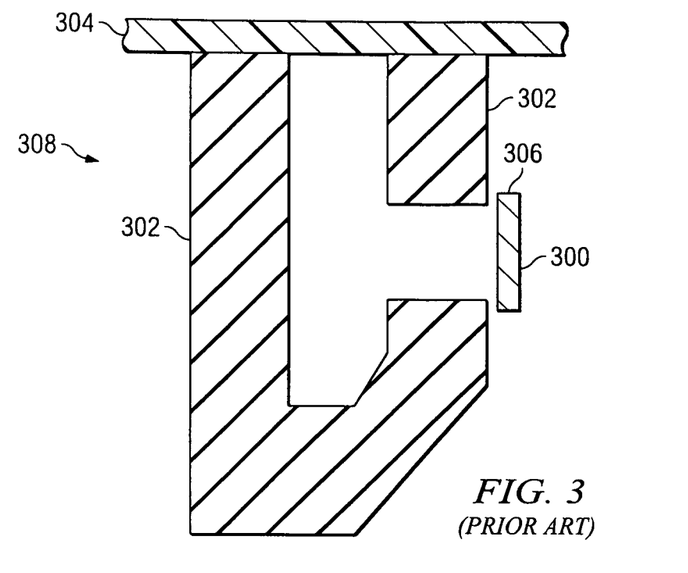
FIG. 3 shows a prior art yoke structure for a giant magneto-resistive sensor, in accordance with an illustrative example of the present invention.
Figure 4:
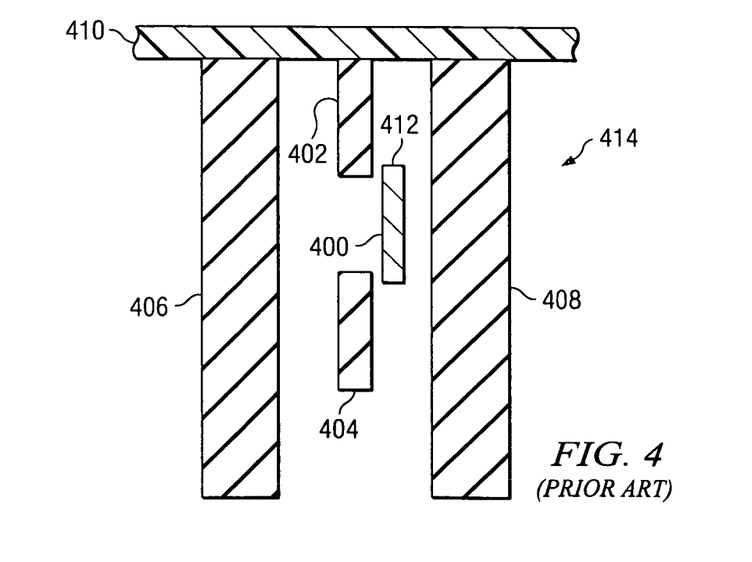
FIG. 4 shows a prior art flux guide structure for a giant magneto-resistive sensor, in accordance with an illustrative example of the present invention.

The layer most susceptible to corrosion is non-magnetic metal layer 116. However, non-magnetic metal layer 116 is also an important layer because non-magnetic metal layer 116 carries half of the current for the magnetic sensor. Furthermore, the spin dependent scattering of the giant magneto-resistive effect occurs mainly at the interface of non-magnetic metal layer 116 and pinned reference layer 118, as well as at the interface of non-magnetic metal layer 116 and free reference layer 114. Other materials that make up the sensor stack of magnetic sensor 100 may be susceptible to corrosion as well. Solutions to the problem of corrosion in non-magnetic metal layer 116 specifically, as well as in the remaining layers of magnetic sensor 100 have been proposed, as shown in FIG. 2 through FIG. 4.

Figure 2:
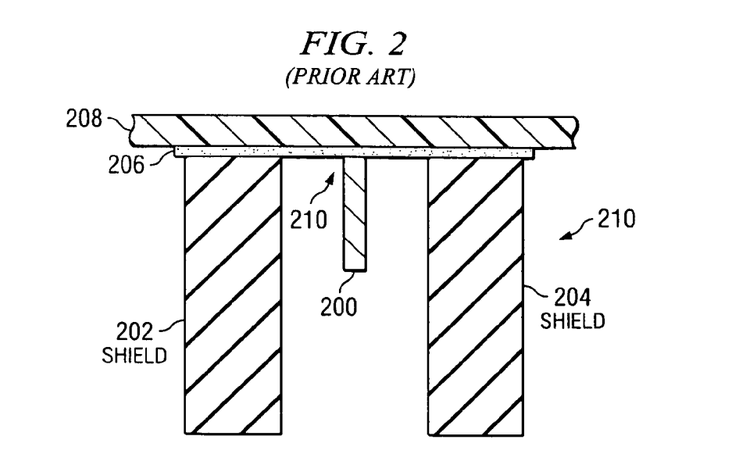
FIG. 2 shows a prior art giant magneto-resistive sensor placed between two shields, in accordance with an illustrative example of the present invention.

FIG. 2 shows a prior art giant magneto-resistive sensor placed between two shields. Giant magneto-resistive sensor 200 can be giant magneto-resistive sensor 100 shown in FIG. 1. Giant magneto-resistive sensor 200 is aligned such that edge 210 corresponds to edge 128 in FIG. 1. Thus, edge 210, or edge 128 of FIG. 1, abuts protective layer 206 and is near magnetic media 208. Shield 202 and shield 204 are provided to control the magnetic field and sensor resolution in the vicinity of giant magneto-resistive sensor 200. Together, giant magneto-resistive sensor. 200, shield 202, and shield 204 form read head 210. FIG. 2 is an example of a prior art solution to corrosion in non-magnetic metal layer 116 specifically, or the entire sensor stack 100 in FIG. 1.

Protective layer 206 acts as a physical barrier between magnetic media 208 and giant magneto-resistive sensor 200. In an illustrative example, magnetic media is a magnetic tape that moves parallel to edge 210 of giant magneto-resistive sensor 200 in the direction from one shield, 202 or 204, to the other shield, 204 or 202. Through friction, magnetic tape can physically erode, giant magneto-resistive sensor 200, and specifically the non-magnetic metal layer within giant magneto-resistive sensor 200. If magnetic media 208 is some other form of magnetic media, such as a hard drive or some other magnetic media, then corrosion can still occur in the non-magnetic metal layer or the entire film stack of giant magneto-resistive sensor 200.

At least two problems exist with this solution. First, protective layer 206 can be worn off by friction between magnetic media 208 and protective layer 206. Second, protective layer 206 induces spacing loss in giant magneto-resistive sensor 200. The spacing loss can reduce the signal detected from magnetic media 208 to unacceptable levels. The reduction in signal reduces the ability of read head 210 to read data from magnetic media 208. Thus, the solution to corrosion in a giant magneto-resistive sensor shown in FIG. 2 is not desirable.

FIG. 3 shows a prior art yoke structure for a giant magneto-resistive sensor. Giant magneto-resistive, sensor 300 can be giant magneto-resistive sensor 100 shown in FIG. 1. Giant magneto-resistive sensor 300 is aligned such that edge 306 corresponds to edge 128 in FIG. 1. Yoke structure 302 is a shield that is provided to control the magnetic flux through giant magneto-resistive sensor 300. FIG. 3 is an example of a prior art solution to corrosion in non-magnetic metal layer 116 in FIG. 1.

In this configuration, giant magneto-resistive sensor 300 is buried within read head 308. Thus, giant magneto-resistive sensor 300 does not directly abut or touch magnetic media 304. Especially in the case that magnetic media 304 is a magnetic tape, this configuration largely prevents corrosion in the non-magnetic metal layer of giant magneto-resistive sensor 300.

However, the solution shown in FIG. 3 is also not desirable. The increased manufacturing complexity of yoke structure 302 increases the cost of read head 308. Furthermore, by moving giant magneto-resistive sensor 300 away from magnetic media 304, maximum efficiency of flux detection in giant magneto-resistive sensor 300 in read head 308 is only about 50%, and is generally in the range of about 20% to about 30%. This reduction in efficiency arises largely from increased magnetic reluctance in the read head. The yoke structure conducts the flux in a loop from the media 304, through yoke structure 302, through sensor 300, through yoke structure 302, and back to media 304. The reduction in efficiency reduces signal strength, and thereby reduces the ability of read head 308 to read data from magnetic media 304.

FIG. 4 shows a prior art flux guide structure for a giant magneto-resistive sensor. Giant magneto-resistive sensor 400 can be giant magneto-resistive sensor 100 shown in FIG. 1. Giant magneto-resistive sensor 400 is aligned such that edge 412 corresponds to edge 128 in FIG. 1. The flux guide structure is a number of shields that are provided to control the magnetic flux through giant magneto-resistive sensor 400. Together, shield 402, shield 404, shield 406, and shield 408 form the flux guide structure. FIG. 4 is an example of a prior art solution to corrosion in non-magnetic metal layer 116 in FIG. 1.

In this configuration, giant magneto-resistive sensor 400 is also buried within read head 414. Thus, giant magneto-resistive sensor 400 does not directly abut or touch magnetic media 404. Especially in the case that magnetic media 404 is a magnetic tape, this configuration largely prevents corrosion in the non-magnetic metal layer of giant magneto-resistive sensor 400.

However, the solution shown in FIG. 4 is also not desirable. Like yoke structure 302 in FIG. 3, the increased manufacturing complexity of the flux guide structure increases the cost of read head 414. Furthermore, by moving giant magneto-resistive sensor 400 away from magnetic media 404, maximum efficiency of flux detection in giant magneto-resistive sensor 400 in read head 414 is only about 50%, and is generally in the range of about 20% to about 30%. This reduction in efficiency arises largely from increased magnetic reluctance in the read head. In this case the flux from the media enters the sensor by first traveling through flux guide 402, then through the sensor entering at 412 and exiting at 400 to enter the flux guide 404. The problem is that while the flux is moving through these components, there is flux leakage to the shields. This flux leakage decreases the efficiency of the structure shown in FIG. 4. The reduction in efficiency reduces signal strength, and thereby reduces the ability of read head 414 to read data from magnetic media 410.

The solutions described with respect to FIG. 2 through FIG. 4 all have some undesirable aspects. Thus, what is needed is a method or device to protect the vulnerable non-magnetic metal layer without introducing additional spacing or signal losses between the magnetic media and the active layer of the giant magneto-resistive sensor.

We have proposed another solution to the problem of corrosion in the non-magnetic metal layer of a giant magneto-resistive sensor. First the non-magnetic metal layer, by itself, is etched back. Thus, referring back to FIG. 1, the edge of non-magnetic metal layer 116 no longer lies along the same axis as edge 128. Instead, the edge of non-magnetic metal layer 116 does not project as far as the edges of the remaining layers. The non-magnetic metal layer is protected through mechanical entrainment, electrolytic plating, electro-less plating, or via some other method. Finally, the giant magneto-resistive sensor is tape lapped to the appropriate pole tip recession. This process successfully addresses the problems described above.

An additional method for solving the problem of corrosion in the non-magnetic metal layer or other materials in the sensor stack of a top spin valve giant magneto-resistive sensor is shown with respect to FIG. 5 through FIG. 8. FIG. 5 through FIG. 8 show a process of forming a top spin valve giant magneto-resistive sensor that is resistant to corrosion in the non-magnetic metal layer or other materials in the sensor stack. A giant magneto-resistive sensor is referred-to as a top spin valve giant magneto-resistive sensor when the pinned layer and non-magnetic metal (typically Cu) layer are deposited above the free layer.

Figure 5:
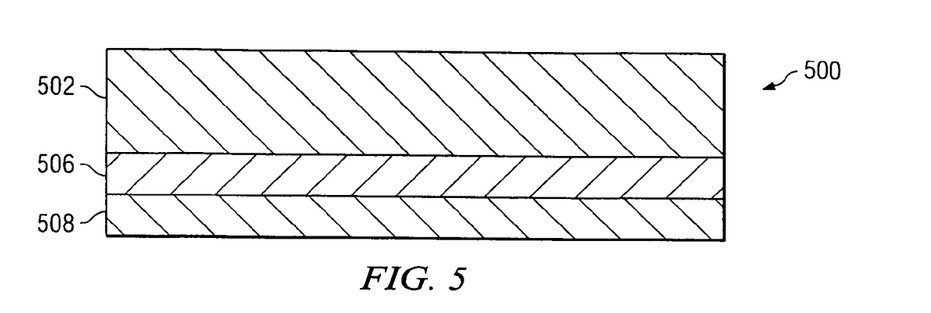
FIG. 5 shows part of a top spin valve giant magneto-resistive sensor film stack, in accordance with an illustrative example of the present invention.
Figure 6:
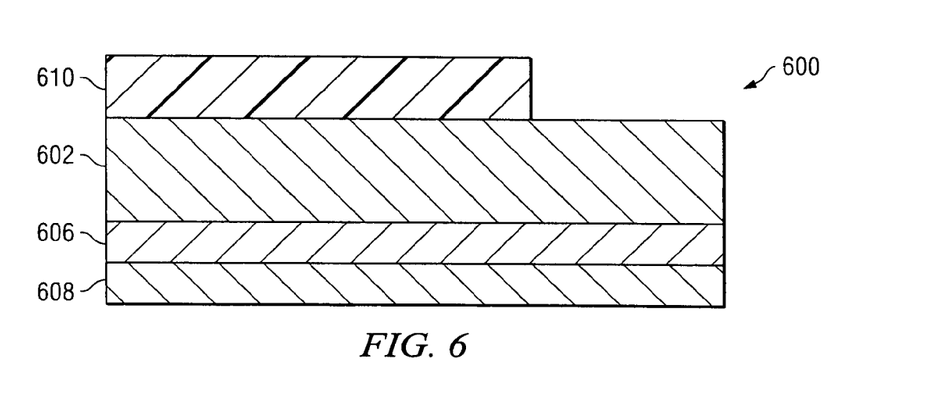
FIG. 6 shows part of a top spin valve giant magneto-resistive sensor film stack with photoresist, in accordance with an illustrative example of the present invention.
Figure 7:
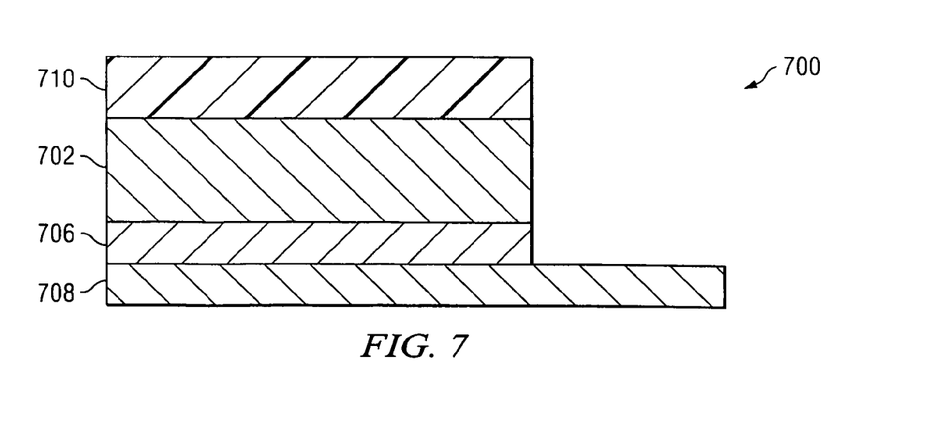
FIG. 7 shows part of a top spin valve giant magneto-resistive sensor film stack with material milled away, in accordance with an illustrative example of the present invention.
Figure 8:
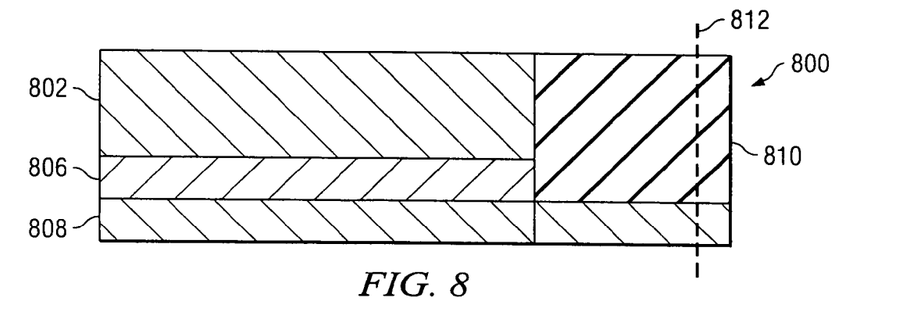
FIG. 8 shows part of a top spin valve giant magneto-resistive sensor film stack after photoresist lift-off, in accordance with an illustrative example of the present invention.

FIG. 5 through FIG. 8 show the steps involved in creating a top spin valve giant magneto-resistive sensor that is resistant to corrosion in the non-magnetic metal layer. FIG. 5 shows an exemplary top spin valve giant magneto-resistive sensor, and each of FIG. 6 through FIG. 8 shows a step in the process. At the end of the process, the top spin valve giant magneto-resistive sensor shown in FIG. 8, which is resistant to corrosion in the non-magnetic metal layer, is created.

FIG. 5 shows part of a top spin valve giant magneto-resistive sensor, in accordance with an illustrative example of the present invention. Top spin valve giant magneto-resistive sensor 500 is similar to giant magneto-resistive sensor 100 shown in FIG. 1. FIG. 5 is a cross section of top spin valve giant magneto-resistive sensor 500, looking along the axis of the permanent magnet parallel to the tape bearing surface.

Top spin valve giant magneto-resistive sensor 500 has a number of layers, including in this illustrative example pinned layer 502, non-magnetic metal layer 506, and free layer 508. Each of layers 502, 506, and 508 are similar to corresponding layers in giant magneto-resistive sensor 100 shown in FIG. 1 in that the layers in top spin valve giant magneto-resistive sensor 500 are made of similar materials that can vary as described above. Thus, for example, non-magnetic metal layer 506 is typically Cu, but can also be CuAu, CuAg, Au, and Ag. In addition, as shown in FIG. 1, more or fewer layers can be added to top spin valve giant magneto-resistive sensor 500. In this case, the procedures described below would be modified to accommodate the additional or fewer layers.

FIG. 6 shows part of a top spin valve giant magneto-resistive sensor, in accordance with an illustrative example of the present invention. Top spin valve giant magneto-resistive sensor 600 corresponds to top spin valve giant magneto-resistive sensor 500 shown in FIG. 5. As a first step in the manufacturing process, photoresist layer 610 is patterned onto the surface of pinned layer 602. A photoresist is a film used in photolithography that temporarily holds the pattern of a circuit path, other element of a chip, or a film layer. When exposed to light, a photoresist hardens and is resistant to the acid bath that washes away unexposed areas of the chip. Other techniques using a photoresist layer can also be implemented, so long as a desired portion of top spin valve giant magneto-resistive sensor 600 is protected from the subsequent milling, etching, or removing processes.

FIG. 7 shows part of a top spin valve giant magneto-resistive sensor, in accordance with an illustrative example of the present invention. Top spin valve giant magneto-resistive sensor 700 corresponds to top spin valve giant magneto-resistive sensor 500 shown in FIG. 5 and top spin valve giant magneto-resistive sensor 600 shown in FIG. 6. In the next manufacturing step, the portion of pinned layer 702, and non-magnetic metal layer 706 not covered or protected by photoresist layer 710 is milled, etched, or otherwise removed. However, free layer 708 is not removed in this manner. Thus, the edge of free layer 708 projects outwardly of the edges of pinned layer 702, and non-magnetic metal layer 706.

FIG. 8 shows part of a top spin valve giant magneto-resistive sensor, in accordance with an illustrative example of the present invention. Top spin valve giant magneto-resistive sensor 800 corresponds to top spin valve giant magneto-resistive sensor 500 shown in FIG. 5, top spin valve giant magneto-resistive sensor 600 shown in FIG. 6, and top spin valve giant magneto-resistive sensor 700 shown in FIG. 7. Next, gap layer 810, is added in the space left by the process of removing pinned layer 802, and non-magnetic metal layer 806. Gap layer 810 can be made from alumina, which is primarily $Al_2O_3$; however, gap layer 810 can be made from a variety of substances such as any number of insulative oxides. In the next manufacturing step, photoresist layer 710 in FIG. 7 is milled, etched, or otherwise removed from the top spin valve giant magneto-resistive sensor 800.

After the wafer manufacturing process, the wafers on which are formed the giant magnetoresistive sensors are diced up into modules. The wafers and/or modules are lapped back such that the edge of top spin valve giant magnetoresistive sensor 800 shared by both free layer 808 and gap layer 810 is lapped back by a mechanical lapping process. Other processes can also be used to lap back these layers. In an illustrative example, gap layer 810 and free layer 808 are lapped back to the position shown by phantom line 812. In this illustrative example, about 400 nanometers are lapped back from gap layer 810 and free layer 808. The area to the left of phantom line 812, relative to the illustrative example shown in FIG. 8, will form a magnetic sensor.

Thus, the method shown in FIG. 5 through FIG. 8 show a process for manufacturing a corrosion-resistant magnetic sensor from a magnetic sensor that includes a number of steps. First, a photoresist layer is formed on the magnetic sensor, the magnetic sensor including a pinned layer, a non-magnetic metal layer, and a free layer, wherein the photoresist layer does not extend across the entire surface of the magnetic sensor. Next, the pinned layer and the non-magnetic metal layer are removed in the portion of the magnetic sensor not covered by the photoresist layer, wherein after removal of the pinned layer and the non-magnetic metal layer, the free layer extends outwardly relative to the pinned layer and the non-magnetic metal layer. Subsequently, the photoresist layer is removed, though this step can be optional in some embodiments. Additionally, a gap layer is added on the free layer in the portion of the magnetic sensor in which the pinned layer and the non-magnetic metal layer have been removed. One or more shields can also be added to form a magnetic read head.

If desirable, additional gap layers can be added to gap layer 810 in order to provide a smooth surface upon which the shield or shields can be deposited. As a practical matter, the forming of such additional gap layers could occur either before or after the permanent magnets of the magnetic sensor are formed, depending on the exact method selected.

The method described with respect to FIG. 5 through FIG. 8 can be varied, so long as the final magnetic sensor has a free layer that projects outwardly relative to the original layers of the magnetic sensor. For example, more or fewer layers can be added during the processes shown in FIG. 5 through FIG. 8. Additionally, additional steps can be taken or fewer steps can be taken, so long as the final magnetic sensor has a free layer that projects outwardly relative to the original layers of the magnetic sensor. For example, in an illustrative example, gap layer 810 can cover pinned layer 802, non-magnetic metal layer 806, and free layer 808, so long as free layer 808 extends outwardly relative to pinned layer 802, and non-magnetic metal layer 806.

Figure 9:
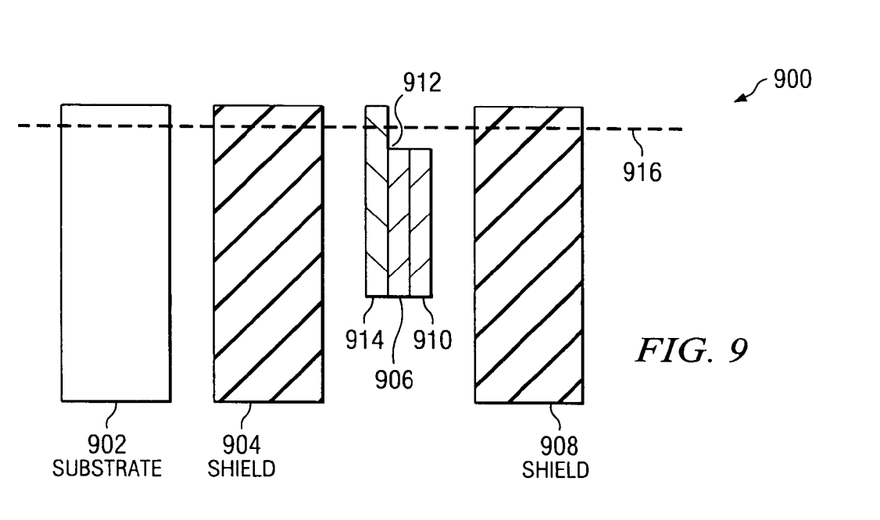
FIG. 9 shows a top spin valve giant magnetoresistive sensor head in use, in accordance with an illustrative example of the present invention.

FIG. 9 shows a giant magnetoresistive sensor head in use, in accordance with an illustrative example of the present invention. Giant magnetoresistive sensor head 900 is similar to giant magnetoresistive sensor head 100 shown in FIG. 1, as modified by the method shown in FIG. 5 through FIG. 8. Thus, giant magneto resistive sensor head 900 includes substrate 902, first shield 904, magnetic sensor 906, and second shield 908. Magnetic sensor 906 includes a number of layers, including pinned layer 910, non-magnetic metal layer 912, and free layer 914. Pinned layer 910 corresponds to pinned layer 802 in FIG. 8, non-magnetic layer 912 corresponds to non-magnetic metal layer 806 in FIG. 8, and free layer 914 corresponds to free layer 808 in FIG. 8. Gap layer 810 shown in FIG. 8 is omitted in FIG. 9 for clarity. Magnetic sensor 906 is lapped back to phantom line 916 which corresponds to phantom line 812 in FIG. 8.

Because non-magnetic metal layer 912 is physically separated from the head/tape interface, as shown in FIG. 9, non-magnetic metal layer 912 (which can be Cu) experiences much less wear and corrosion during use.

Figure 10:
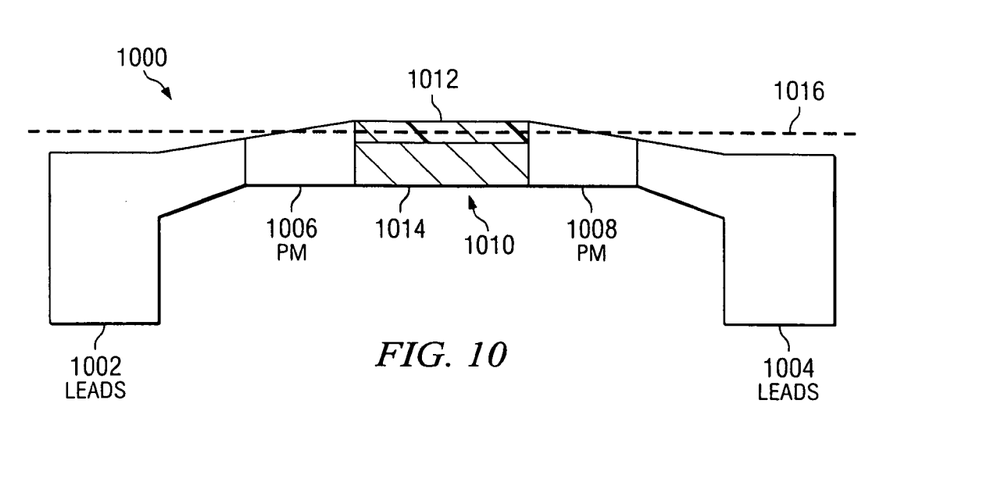
FIG. 10 shows a top spin valve giant magnetoresistive sensor head in use, in accordance with an illustrative example of the present invention.

FIG. 10 shows a giant magnetoresistive sensor head in use, in accordance with an illustrative example of the present invention. Giant magnetoresistive sensor head 1000 shown in FIG. 10 is a top view of giant magnetoresistive sensor head 900 shown in FIG. 9, with phantom line 1016 corresponding to phantom line 916 in FIG. 9.

Giant magnetoresistive sensor head 1000 includes lead 1002 and lead 1004 which serve as electrical leads for giant magnetoresistive sensor head 1000. Similarly, permanent magnet 1006 and permanent magnet 1008 are a part of giant magnetoresistive sensor head 1000. Magnetic sensor 1010 corresponds to magnetic sensor 906 in FIG. 9, as seen from a top view. Thus, tape 900 lies just above the page as one views FIG. 10 and the head/tape interface is at the level of the page. Similarly, free layer 1012 corresponds to free layer 914 in FIG. 9 and surface 1014 corresponds to the surface of layer 910 in FIG. 9.

In an illustrative example, the edges of the layers of the giant magnetoresistive sensor are about parallel to each other. The term "about parallel" edges means that the edges in question are parallel or approximately parallel to a common axis. However, the angle from the common axis can vary somewhat and still be about parallel. In other illustrative examples, the edges need not be about parallel to each other. Similarly, the term "about perpendicular" means that the edges in question are perpendicular or approximately perpendicular to a common axis, usually the long axis of a layer. However, the angle from the common axis can vary somewhat and still be about perpendicular.

The aspects of the present invention have several advantages over known corrosion-resistant magnetic sensors. For example, the non-magnetic metal layer is removed from the magnetic sensor/magnetic media interface, thereby reducing corrosion in the non-magnetic metal layer. In addition, the free layer remains at the magnetic sensor/magnetic media interface; thus, no additional spacing losses occur. Additionally, the free layer remains continuous so as to provide optimum magnetic performance. Additionally, the magnetic sensor described herein is compatible with most older magnetic media; thus, the magnetic sensor described herein can be used with both legacy magnetic storage systems, current magnetic storage systems, and future magnetic storage systems. Thus, the aspects of the present invention provide for a magnetic sensor that is both corrosion resistant and not subject to the same degradation in sensitivity seen in previous corrosion-resistant magnetic sensors.

The description of the present invention has been presented for purposes of illustration and description, and is not intended to be exhaustive or limited to the invention, in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetic sensor, including a plurality of layers, the layers being adjacent to one another along a first axis, and the layers having terminating ends along a second axis, perpendicular to the first axis, wherein a first terminating end of each layer along the second axis forms a sensing end, operable to read a magnetically readable storage material, the sensor comprising:
- a first layer comprising a pinned layer;
- a second layer comprising a non-magnetic metal layer and adjacent to the first layer; and
- a third layer comprising a free layer, wherein the first terminating end of the third layer along the second axis extends further along the second axis than the first terminating ends of the first and second layers.

2. The magnetic sensor of claim 1 wherein the first terminating end and the second terminating end are substantially parallel to each other.

3. The magnetic sensor of claim 1 wherein the second layer comprises copper.

4. The magnetic sensor of claim 1 further comprising:
a fourth layer comprising a gap layer positioned adjacent to the terminating ends of the first layer and the second layer along the second axis and adjacent to the third layer along the first axis.

5. The magnetic sensor of claim 1 wherein the first terminating end and the second terminating end lie along the same plane.

6. The magnetic sensor of claim 4 further comprising:
at least one magnetic shield positioned relative to the first layer, the second layer, the third layer, and the fourth layer along the first axis such that a read head is formed.

* * * * *

UNITED STATES PATENT AND TRADEMARK OFFICE
CERTIFICATE OF CORRECTION

| | | |
|---|---|---|
| PATENT NO. | : 8,867,176 B1 | Page 1 of 1 |
| APPLICATION NO. | : 11/447636 | |
| DATED | : October 21, 2014 | |
| INVENTOR(S) | : Nibarger et al. | |

It is certified that error appears in the above-identified patent and that said Letters Patent is hereby corrected as shown below:

In the Specification

In column 4, line 5, delete "sensor." and insert -- sensor --, therefor.

In column 4, line 15, delete "erode," and insert -- erode --, therefor.

In column 8, line 54, delete "invention," and insert -- invention --, therefor.

Signed and Sealed this
Sixteenth Day of June, 2015

Michelle K. Lee
*Director of the United States Patent and Trademark Office*